Nov. 10, 1964    W. A. DERINGER    3,156,489
REINFORCEMENT FOR END OF A TUBULAR MEMBER
Filed March 12, 1963
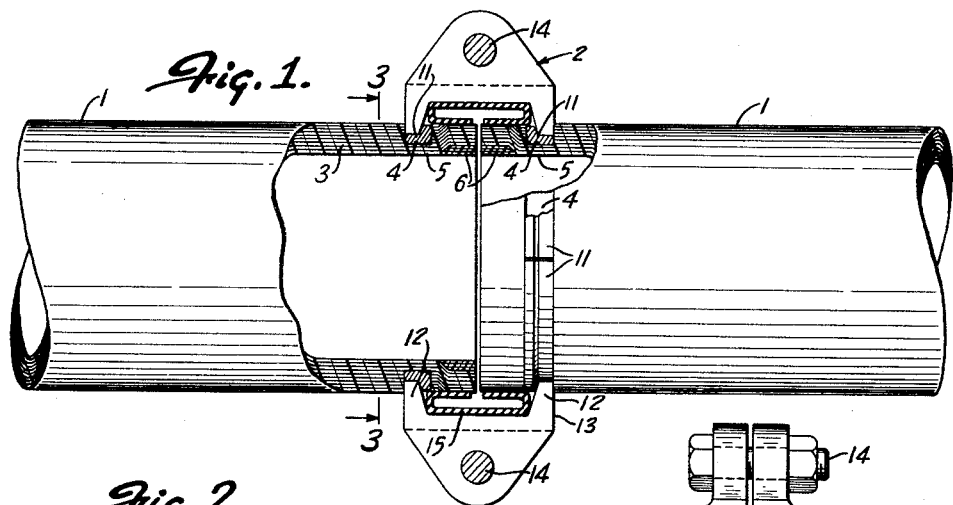
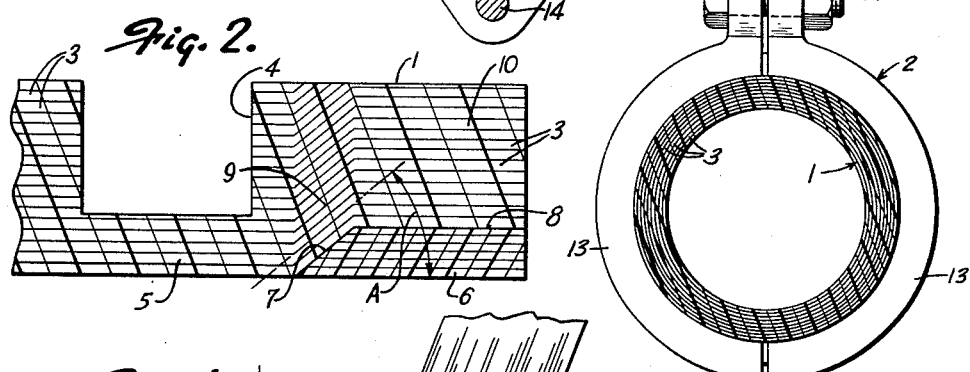
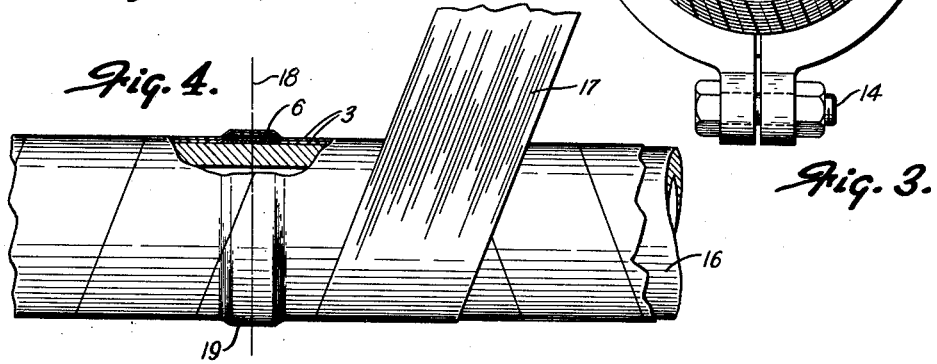
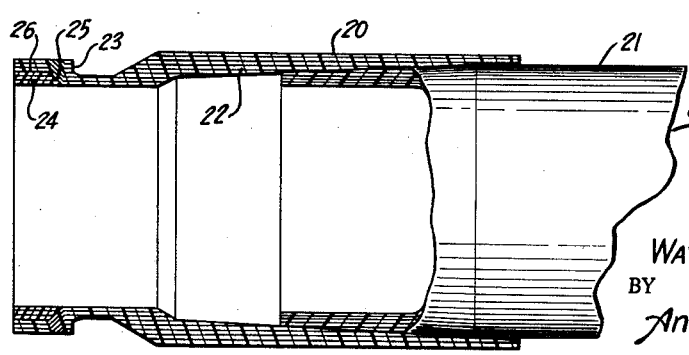
INVENTOR.
WAYNE A. DERINGER
BY
Andrus & Starke
ATTORNEYS

# United States Patent Office 3,156,489
Patented Nov. 10, 1964

3,156,489
REINFORCEMENT FOR END OF A TUBULAR MEMBER
Wayne A. Deringer, Shorewood, Wis., assignor to Dowsmith Inc., Milwaukee, Wis., a corporation of Delaware
Filed Mar. 12, 1963, Ser. No. 264,558
1 Claim. (Cl. 285—114)

This invention relates to a pipe construction and more particularly to a pipe construction for use with a coupling mechanism and to a method of making the same.

Reinforced plastic pipe is generally fabricated by winding a strand or tape of fibrous material impregnated with a resin binder around a mandrel in a series of superimposed laminated layers, with the number of layers depending on the strength requirements for the pipe. In service, the reinforced plastic pipe sections are normally joined together by removable couplings which are attached to the adjacent ends of the pipe sections. To prevent axial movement of the pipe sections with respect to the coupling, the ends of the pipe sections are usually formed with circumferential grooves and the coupling engages the groove to prevent the pipe sections from slipping out of the coupling. The circumferential groove is normally spaced a short distance from the end of the pipe section and the portion of the pipe section located between the end and the groove is subjected to considerable shear stress in service. It has been found that this portion of the pipe, between the pipe end and the groove, will occasionally shear along the laminated layers when this portion is subjected to relatively low stress due to the lack of radial reinforcement in this portion.

The present invention is directed to an improved pipe construction which provides added radial reinforcement to the area of the pipe section located between the groove and the end of the pipe section.

Each pipe section is formed of a series of superimposed laminated layers of fibrous material bonded together with a resin. In order to couple the pipe sections together in an end-to-end relation, each pipe section is provided with a circumferentially extending groove which is spaced a short distance from the end of the pipe section. The laminated layers in the area of the pipe section located radially inward of the groove are arranged in a generally cylindrical pattern and the laminated layers in the area of the pipe section between the groove and the end of the pipe section diverge outwardly and are arranged in a generally frustoconical pattern. The diverging laminations in this area of the pipe resist shear stress and enable a substantially greater shear load to be applied through the coupling before this portion of the pipe is subjected to a shear fracture.

To fabricate the pipe, an insert ring is initially located on the outer surface of a mandrel. Preferably, the ring is formed with a beveled end surface and a generally cylindrical outer surface. A fibrous strand impregnated with a liquid, uncured, thermosetting resin is wound about the mandrel and over the insert in a generally helical pattern to form a series of superimposed, laminated layers. The laminated layers located over the mandrel are in a generally cylindrical pattern, while the laminations extending over the beveled end of the insert ring diverge outwardly and are located at an angle with respect to the axis of the mandrel. After the suitable number of layers have been wound over the mandrel and the insert to provide the pipe with the desired strength characteristics, the resin is cured to provide an integral pipe structure. The end of the pipe is trimmed at the area of the insert and a circumferential groove is then machined in the outer surface of the pipe section adjacent the diverging laminated layers. The groove is adapted to receive a pipe coupling.

The present invention provides a simple method for providing reinforcement in the area of the pipe between the circumferential groove and the end of the pipe, which substantially increases the stress load required to shear this area.

Other objects and advantages will appear in the course of the following description.

The drawings illustrate the best mode presently contemplated of carrying out the invention.

In the drawings:

FIG. 1 is a longitudinal section showing pipe sections constructed in accordance with the invention and joined by a coupling;

FIG. 2 is an enlarged fragmentary, longitudinal section showing the laminated layers at the end of the pipe section;

FIG. 3 is a section taken along line 3—3 of FIG. 1;

FIG. 4 is a side elevation showing the method of fabricating the pipe sections; and FIG. 5 is a modified form of the invention showing an adapter joined to the end of the pipe section.

The drawings illustrate a pair of pipe sections 1 joined together in an end-to-end relation by a coupling 2. Each pipe section 1 is formed of a series of superimposed laminated layers 3 of fibrous material bonded together with a binder, such as a thermosetting resin. The fibrous reinforcement may take the form of tape, webbing, braided tubing, roving, yarn, or the like. A fibrous reinforcing material may be any of the common materials used to reinforce resin or plastic articles, as for example, ceramic or mineral fibers, such as glass and asbestos; synthetic fibers such as nylon, rayon, Dacron or Orlon; vegetable fibers such as cotton; animal fibers such as wool; or metal fibers such as steel wire.

The resin to be employed in the present invention can be any of the common resins used for reinforced plastic articles, such as epoxy, polyester, melamine, phenolformaldehyde and the like. Epoxy resins have proven particularly satisfactory and they may be prepared by condensing a polyhydric phenol with a polyepoxide or polyfunctional halohydrin, as disclosed for example in Patent 2,801,227. In addition, some of the more rigid thermoplastic resins can be employed in some situations. Examples of thermoplastic resins which can be used are polyvinyl chloride, vinyl butyral, and the like.

Each of the pipe sections 1 is provided with a circumferential groove 4 which circumscribes the section and is spaced a short distance from the end thereof. As best shown in FIG. 2, the laminated layers in the area 5 of the pipe section located radially inward of the groove 4, are arranged in generally cylindrical configuration, with the laminations, at any longitudinal section, being generally parallel to the axis of the pipe section.

An insert 6 is bonded to the inner surface of each pipe section 1 and, as shown in FIG. 2, the insert, which can be formed of fiber reinforced resin material, is provided with a sloping or inclined end surface 7 and a generally cylindrical outer surface 8. The laminations of the pipe section 1 follow the inclined surface 7 of the insert ring 6, as indicated by 9 so that the laminations located radially outward of the surface 7 are in generally parallel relation and are disposed at an inclined acute angle with respect to the axis of the pipe section. In other words, the laminated layers in the area 9 diverge outwardly and are arranged in a generally frustoconical pattern. The forward wall forming groove 4 is closely adjacent the inclined laminations.

The laminations in the area 10 of each pipe section, located radially outward of the surface 8 of insert ring 6, generally are parallel to the axis of the mandrel and parallel to the outer surface 8.

The laminations in the area 9 which extend at an acute angle with respect to the axis of the pipe section, provide radial reinforcement and resist shear stress. In the conventional pipe construction, the laminations in the area between the groove 4 and the end of the pipe, would be parallel to the axis of the pipe section. Any shear stress applied to the laminations of this area tend to shear this area along the plane of the laminations. With the use of the present invention, diagonally extending laminations are provided in this weakest area which substantially improves the resistance of this area to shear stress.

The laminated layers in the area 9 generally extend at an angle A of 30° to 90° with respect to the axis of the pipe section, as shown in FIG. 2. Preferably, the angle A is between 45° to 60° to obtain optimum benefits.

While the beveled surface 7 of ring 6 is shown to be a flat inclined surface, the surface 7 can be rounded, stepped or have any other configuration which will provide the angularity for the laminated layers in the area 9.

As shown in FIG. 1, a split metal ring 11 is located within each of the grooves 4. The ring 11 has a generally L-shaped cross section and the annular ridges 12 of coupling 2 engage and bear against the metal inserts 11 to prevent damage to the pipe section itself. The coupling 2 is formed in two half sections 13 which are joined together by bolts 14. The joint between the opposed ends of the pipe sections 1 are sealed by an annular seal 15 which is located between the ridges 12 of the coupling 2. The coupling itself is of conventional design and forms no part of the invention.

FIG. 4 illustrates the method of forming the pipe construction of the invention. The insert ring 6 is initially placed on the outer surface of a generally cylindrical mandrel 16. A strand 17 of fibrous material suitably impregnated with a liquid resin, is then wrapped or wound over the outer surface of the mandrel 16 and over the insert 6 in a generally helical winding pattern. The strand 17 is wound in a series of superimposed layers with each layer having the opposite helix angle from adjacent layers. The number of layers depends on the strength requirement of the pipe section.

After the desired number of layers have been wound over the mandrel and insert 6, the resin is cured to provide an integral pipe construction in which the insert 6 is firmly bonded to the laminated layers 3.

The cured pipe is then severed along line 18, as indicated in FIG. 4, to provide a pair of pipe sections with the original insert 6 then being severed into two halves, each of which is bonded within the end of the corresponding pipe section. After the pipe sections 1 have been severed, the pipe sections are stripped from the mandrel 16 and the grooves 4 are machined in the outer surface. In addition, the raised portion of the pipe section, located outwardly of insert 6 and indicated by 19, can also be machined so that this portion is flush with the outer surface of the pipe section.

FIG. 5 shows a modified form of the invention in which an adapter 20 is secured to an end of the pipe section 21. In this embodiment, the pipe section is inserted within the wedge-shaped central opening of the adapter 20 and is bonded therein by a suitable adhesive or resin.

In this form of the invention, the adapter is formed of a series of superimposed laminated layers 22, similar to the pipe section 1 of the first embodiment.

As shown in FIG. 5, a circumferential groove 23 is formed in the end of the adapter and spaced a short distance from the end. As in the first embodiment, the laminations located radially inward of the groove 23 are generally cylindrical in configuration and are parallel to the axis of the adapter. As in the case of the first embodiment, an insert ring 24 is bonded within a recess in the end of the adapter and is provided with a beveled surface 25 and a cylindrical outer surface 26. The laminations located radially outward of the beveled surface 25 are parallel to the beveled surface and are disposed at an acute angle to the axis of the adapter. The laminations located radially outward of the surface 26 of the insert ring again are parallel to the axis of the adapter.

As in the first embodiment, the diagonally extending laminations serve to provide additional radial reinforcement in the area of the adapter between the groove 23 and the adjacent end to thereby increase the resistance of the adapter to shear stress.

Adapter 23 is adapted to be connected to an identical adapter by a coupling similar to coupling 2, previously described.

The pipe construction of the invention improves the resistance of the area between the pipe end and the groove to shear stress and enables a substantially greater shear load to be applied through the coupling before this area is subjected to a shear fracture.

Various modes of carrying out the invention are contemplated as being within the scope of the following claim particularly pointing out and distinctly claiming the subject matter which is regarded as the invention.

I claim:

A reinforcement for the end portion of a tubular member circumscribed by a clamp-receiving groove and with said end portion disposed between said groove and the adjacent end of the member, which comprises an annular recess in the internal surface of the member at said end portion and said tubular member being formed of a series of superimposed laminated layers, and an insert ring located in the recess and bonded to said tubular member with the outer end of said insert ring facing said end of the tubular member and the inner end of said insert ring being inclined, the laminated layers of said tubular member located radially outward of said inner inclined end being disposed generally parallel to said inclined end to provide radial reinforcement to said end portion to resist shear stresses, the forward wall forming said groove being closely adjacent said inclined laminations.

References Cited in the file of this patent

UNITED STATES PATENTS

| | | |
|---|---|---|
| 2,296,781 | Farny | Sept. 22, 1942 |
| 2,377,510 | Newell | June 5, 1945 |
| 2,843,153 | Young | July 15, 1958 |

FOREIGN PATENTS

| | | |
|---|---|---|
| 114,384 | Australia | Dec. 24, 1941 |